(12) United States Patent
Brown et al.

(10) Patent No.: US 8,687,490 B2
(45) Date of Patent: *Apr. 1, 2014

(54) ELECTRONIC MESSAGE DELIVERY SYSTEM INCLUDING A NETWORK DEVICE

(75) Inventors: Scott T. Brown, Superior, CO (US);
Kelly A. Wanser, Thornton, CO (US);
Paul Trout, Loveland, CO (US)

(73) Assignee: Dell Software Inc., Aliso Viejo, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 12/816,460

(22) Filed: Jun. 16, 2010

(65) Prior Publication Data

US 2011/0141902 A1    Jun. 16, 2011

Related U.S. Application Data

(63) Continuation of application No. 11/300,097, filed on Dec. 13, 2005, now Pat. No. 7,760,640.

(60) Provisional application No. 60/635,803, filed on Dec. 13, 2004.

(51) Int. Cl.
*H04J 3/16* (2006.01)

(52) U.S. Cl.
USPC ............................ 370/235; 370/469; 709/230

(58) Field of Classification Search
None
See application file for complete search history.

(56) References Cited

U.S. PATENT DOCUMENTS

| | | | |
|---|---|---|---|
| 6,198,722 B1 | 3/2001 | Bunch | |
| 6,556,540 B1 | 4/2003 | Mawhinney et al. | |
| 6,556,586 B1 * | 4/2003 | Sipila | 370/469 |
| 6,795,435 B1 | 9/2004 | Jouppi et al. | |
| 2003/0074554 A1 * | 4/2003 | Roach et al. | 713/153 |
| 2003/0161268 A1 | 8/2003 | Larsson et al. | |
| 2004/0213150 A1 | 10/2004 | Krause et al. | |
| 2005/0089044 A1 * | 4/2005 | Ciscon et al. | 370/395.21 |
| 2006/0136570 A1 * | 6/2006 | Pandya | 709/217 |
| 2007/0019615 A1 * | 1/2007 | Baek et al. | 370/352 |

* cited by examiner

*Primary Examiner* — Hassan Kizou
*Assistant Examiner* — Roberta A Shand
(74) *Attorney, Agent, or Firm* — Winstead PC

(57) ABSTRACT

In a computer network system based on an open system interconnection model, where the computer network system includes at least a network layer (Layer 3) and an application layer (Layer 7), a system and a method for managing electronic message traffic into and out of the computer network system including defining a communication channel between Layer 3 and Layer 7 for exchanging data directly therebetween for use in enhancing flow of the electronic message traffic.

18 Claims, 10 Drawing Sheets

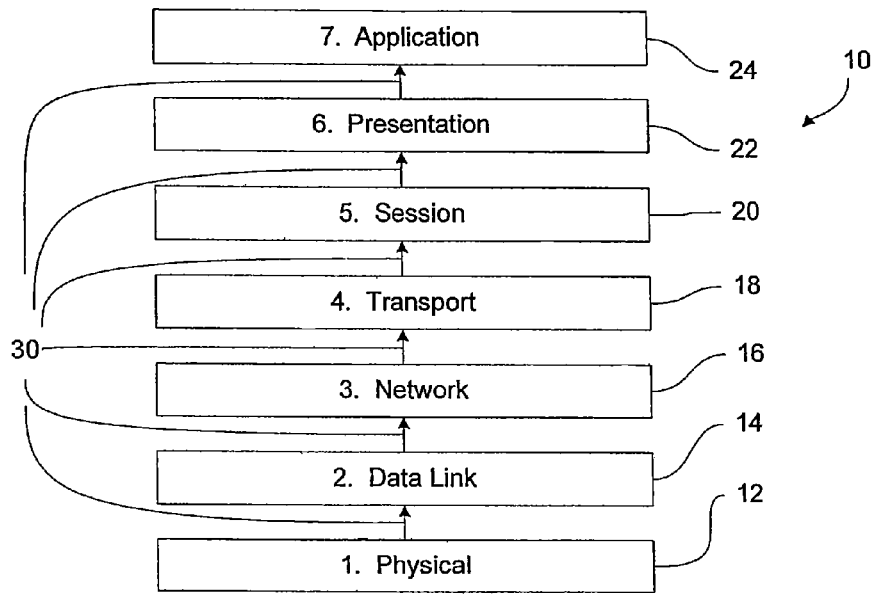
FIG. 1
(PRIOR ART)
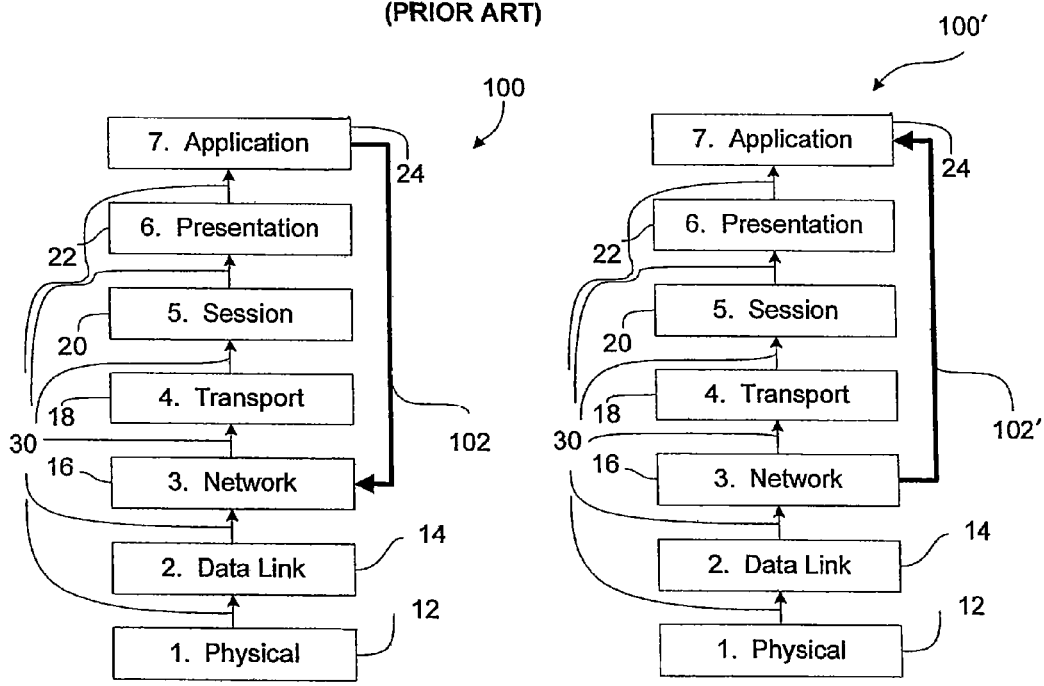
FIG. 2
FIG. 3

US 8,687,490 B2

ELECTRONIC MESSAGE DELIVERY SYSTEM INCLUDING A NETWORK DEVICE

CROSS-REFERENCE TO RELATED APPLICATIONS

This patent application is a continuation of U.S. patent application Ser. No. 11/300,097, filed on Dec. 13, 2005 now U.S. Pat. No. 7,760,640. U.S. patent application Ser. No. 11/300,097 claims priority from U.S. Provisional Patent Application No. 60/635,803, filed on Dec. 13, 2004. U.S. patent application Ser No. 11/300,097 and U.S. Provisional Patent Application No. 60/635,803 are incorporated herein by reference.

BACKGROUND OF THE DISCLOSURE

The present disclosure relates generally to electronic messaging systems and, more particularly, to an electronic message delivery system for processing electronic messages from a sender to a recipient through the Internet.

Today, the most prevalent form of electronic messaging, email, is a mission critical service operating on networks; and email traffic and management complexity is rapidly increasing. As network operators look to respond to capacity and complexity challenges while managing the size of their email networks and the cost of operating them, there is a strong and growing demand for better solutions.

Email is a form of electronic communication between servers that is defined by a communication protocol called Simple Mail Transport Protocol (SMTP). The SMTP protocol is the communication mechanism by which email messages are commonly moved from one server to another, and involves a multi-step exchange of information between two servers for the transmission of a message from one to the other. Similar protocols are used for other types of electronic messaging (e.g. SMS).

It is commonly known that there are seven layers to the Open System Interconnection model, also known as the OSI model, which describes the multi-layered operating environment of computer systems and networks. Each layer represents a step of abstraction above the next, from the lowest level machine code than runs bits and bytes on the hardware (Layer 1 or "Physical Layer") to the highest layer (Layer 7 or "Application Layer"). An example of a traditional, computer network system based on the OSI model is illustrated in FIG. 1. FIG. 1 shows a computer network system 10, including a physical layer 12 (Layer 1), a data link layer 14 (Layer 2), a network layer 16 (Layer 3), a transport layer 18 (Layer 4), a session layer 20 (Layer 5), a presentation layer 22 (Layer 6) and an application layer 24 (Layer 7). As indicated by a series of arrows 30, each layer communicates only with the immediately adjacent layer. That is, information is exchanged only between adjacent layers in a typical OSI system.

SMTP and other electronic message protocols are executed via software applications that run on the highest layer, Layer 7 (or application layer 24, as shown in FIG. 1). Many important functions of electronic traffic routing and security are conducted at the level at which data packet transactions occur, Layer 3 (i.e., network layer 3, as shown in FIG. 1). This is the arena of operation for the primary functions of many network devices including routers, switches, firewalls and others.

In a typical email system, the email server, or mail transport agent (MTA), operates solely on Layer 7. In a network containing an email system, the Network Layer, Layer 3, typically acts on network traffic (e.g. to route data packets) with no regard to application related protocols or requirements and no interaction with message-related functions or settings. Thus, for email and other message traffic, routing and security functions (e.g. priority, traffic access, bandwidth allocation, fail-over, data encryption, relay etc.) are performed separately, using independently determined criteria and wholly independent actions at Layer 3 and Layer 7. Any relevant traffic flow or security information gathered at one layer is visible only to, and actionable only on, that layer.

A standard network configuration for electronic messaging consists of a message transport server (e.g. MTA) and a network device for routing data into and out of the network (e.g. switch). The MTA and network device are configured separately and do not communicate. An example of such a standard network configuration is shown in FIG. 4A. FIG. 4A illustrates a prior art electronic messaging system 50, including an MTA 52 connected via a network device 54 to Internet 56. MTA 52 and network device 54 communicate by an SMTP link 58 (indicated by a double-headed arrow), and network device 54 is connected to Internet 56 by another SMTP link 60 (indicated by another double-headed arrow). Network device 54 may include an API or command interface 62, but interface 62 is not directly connected with MTA 52 nor Internet 62.

SUMMARY OF THE DISCLOSURE

As will be described in more detail hereinafter, there is disclosed herein a method for use in a computer network system based on an open system interconnection model. The computer network system includes at least a network layer (Layer 3) and an application layer (Layer 7). This method for managing an input flow and an output flow of electronic message traffic into and out of the computer network system, respectively, includes exchanging information directly between Layer 3 and Layer 7 for use in enhancing at least one of the input flow and the output flow of the electronic message traffic. The term "enhancing" is to be understood to encompass a variety of related processes including, but not limited to, directing of the message traffic, monitoring of message traffic, guaranteeing bandwidth for certain portions of the message traffic and prioritizing message traffic, as will be described in detail in the following description.

Another embodiment is a computer network system based on an open system interconnection model. The computer network system is configured to support an input flow and an output flow of electronic message traffic into and out of the computer network system, respectively. The computer network system includes a network layer (Layer 3) and an application layer (Layer 7) as well as a communication channel between Layer 3 and Layer 7 for exchanging information directly therebetween for use in enhancing at least one of the input flow and the output flow of electronic message traffic. Again, the term enhancing includes a variety of actions such as, but not limited to, directing of message traffic, monitoring of message traffic, guaranteeing bandwidth for certain portions of the message traffic and prioritizing message traffic, as will be described in detail in the following description of the present disclosure.

Still another embodiment is a configuration for use in a computer network system based on an open system interconnection model, which includes a network layer (Layer 3) and an application layer (Layer 7) and is configured to support an input flow and an output flow of electronic message traffic into and out of the computer network system, respectively. The configuration includes a communication channel between Layer 3 and Layer 7 for exchanging information directly therebetween for use in enhancing at least one of the input flow and the output flow of the electronic message traffic.

BRIEF DESCRIPTION OF THE SEVERAL VIEWS OF THE DRAWING

The present disclosure may be understood by reference to the following detailed description taken in conjunction with the drawings briefly described below. It is noted that, for purposes of illustrative clarity, certain elements in the drawings may not be drawn to scale.

FIG. 1 is a diagrammatic illustration, in a block diagram form, showing the major components of an Open System Interconnection model in accordance with the currently available prior art.

FIG. 2 is a diagrammatic illustration showing a new model of interconnection between Levels 7 and 3 in the OSI model in accordance with the present disclosure.

FIG. 3 is a diagrammatic illustration showing another model of interconnection between Levels 3 and 7 in the OSI model in accordance with the present disclosure.

DETAILED DESCRIPTION OF THE DISCLOSURE

The following description is presented to enable one of ordinary skill in the art to make and use the disclosure and is provided in the context of a patent application and its requirements. Various modifications to the described embodiments will be readily apparent to those skilled in the art and the generic principles herein may be applied to other embodiments. Thus, the present disclosure is not intended to be limited to the embodiment shown but is to be accorded the widest scope consistent with the principles and features described herein.

Given Applicants' recognition that in handling electronic message traffic many similar routing and security functions are performed at both Layer 3 and Layer 7 of the OSI model, it is further recognized herein that there are benefits to creating a communication channel between the two layers that allows commands executed in one layer to be transmitted to the other and for traffic flow and other information to be relayed across layers for joint monitoring, reporting and action.

It represents a significant advance in the state of the art in electronic messaging to create a communications channel that allows the transmission of commands and data from a Layer 7 electronic messaging application to a Layer 3 network device and for a Layer 3 network device to transmit commands and data to a Layer 7 electronic messaging application. Such processes are illustrated in FIGS. 2 and 3, in conjunction with FIG. 1. FIG. 2 illustrates a modified computer network system 100 including the same seven levels as shown in FIG. 1. However, a communication channel 102 (indicated by an arrow) from Layer 7 to Layer 3 allows direct transmission of information from Layer 7 to Layer 3. Similarly, in FIG. 3, a modified computer network system 100' includes a communication channel 102' (indicated by another arrow) from Layer 3 to Layer 7 to enable direct transmission of information from Layer 3 to Layer 7.

This integrated approach to routing and security for electronic message traffic creates a new type of system in which email services are integrated with network services, or "Email Services on the Network". By combining the strengths of a message transport agent (MTA) in handling Layer 7 electronic message protocol (e.g. SMTP) traffic with the Layer 3 network packet routing, a new a paradigm is established for message transport and message network architecture.

Figure 4A:
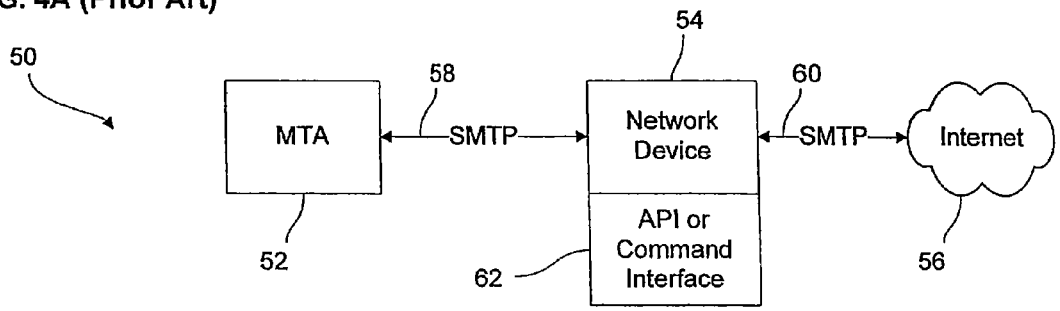
FIG. 4A is a flow chart illustrating a standard network configuration for electronic messaging in which the MTA and the network device do not communicate, as in accordance with the prior art.
Figure 4B:
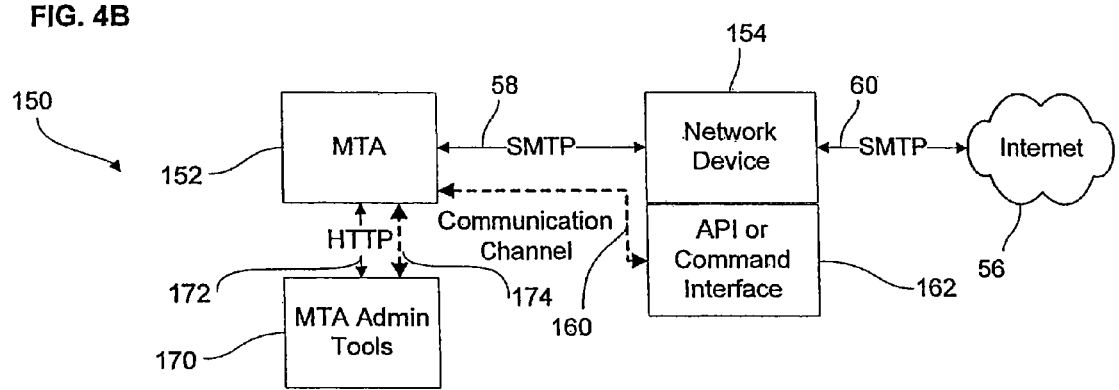
FIG. 4B is a flow chart illustrating a new configuration in which the MTA and the network device do communicate, in accordance with the present disclosure.

A modified configuration for a computer network system is shown in FIG. 4B. Referring to FIG. 4B in conjunction with FIG. 4A, a modified, computer network system 150 includes an MTA 152 connected with internet 56 through a network device 154. As in computer network system 50 of FIG. 4A, MTA 152 and network device 154 are connected by SMTP link 58, and network device 154 is connected with Internet 56 by another SMTP link 60. However, in computer network system 150, an additional, communication channel 160 is established between MTA 152 and an API or command interface 162, which is connected with network device 154. That is, MTA 152 is connected over communication channel 160, such as a network communication interface to the network device, which serves to communicate commands and information between MTA 152 and network device 154. Furthermore, for example, MTA 152 may include a control interface 170 containing MTA administration tools. In modified computer network system 150, control interface 170 is connected with MTA 152 by an HTTP connection 172 (indicated by a double-headed arrow) as well as a second interactive connection 174 (indicated by a dashed, double-headed arrow). In modified, computer network system 150, while HTTP connection 172 carries standard exchange of information between MTA 152 and control interface 170, second interactive connection 174 serves to transmit new configuration information from control interface 170 through communication channel 160 to network device 154.

Figure 5:
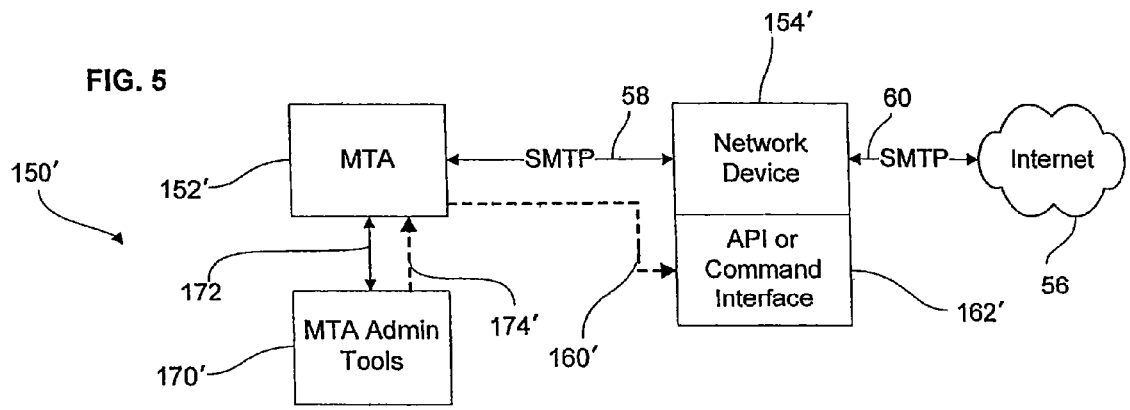
FIG. 5 is a flow chart illustrating a static configuration of transmitting commands or publishing configuration instructions from the MTA to the network device.

When transmitting commands or publishing configuration instructions, there are two styles of configuration: static and dynamic. A static configuration is accomplished when information entered into the MTA administrative console is transferred to the network device (via API or command interface of the network device). An example of a static configuration is shown in FIG. 5. A computer network system 150' of FIG. 5 includes the same basic components as computer network system 150 of FIG. 4B, but information from a control interface 170' is transmitted via an interactive connection 174' to MTA 152' (which remains static until receiving the information, such as a command or a set of instructions, from the control interface) and onto a network device 154' (which also remains static until receiving the information from the control interface) through a communication channel 160' via interface 162'. That is, changes in MTA 152' or network device 154' require input of information at control interface 170'. This process is an example of an information transfer from Layer 7 to affect Layer 3 according to an active user input. It is noted that the term "publishing" is understood in the present disclosure as the transmission of given information such as, but not limited to, configurations and commands.

Figure 6:
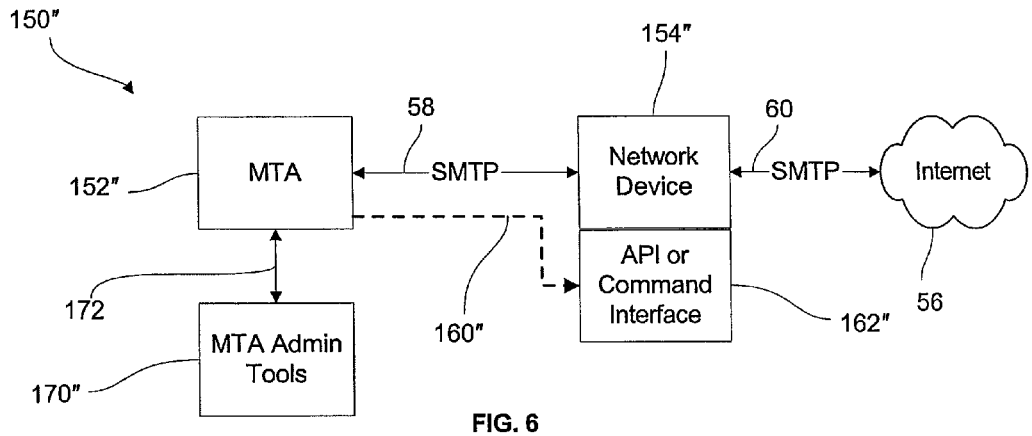
FIG. 6 is a flow chart illustrating a dynamic configuration of transmitting commands or publishing configuration instructions from the MTA to the network device.

A dynamic configuration occurs when the MTA makes a configuration change to the network device without user interaction or input at the control interface. Such a system is illustrated in FIG. 6. Again, a computer network system 150" of FIG. 6 includes the same basic components as computer network system 150, but MTA 152" dynamically initiates transfer of information through a communication channel 160" via interface 162" and to network device 154". In this case, changes in MTA 152" or network device 154" do not require input of information at control interface 170" but rather a dynamic process initiated by MTA 152" itself. The process illustrated in FIG. 6 is an example of an information transfer from Layer 7 to affect Layer 3 with the information transfer being initiated at Layer 7 without an external input.

Figure 7:
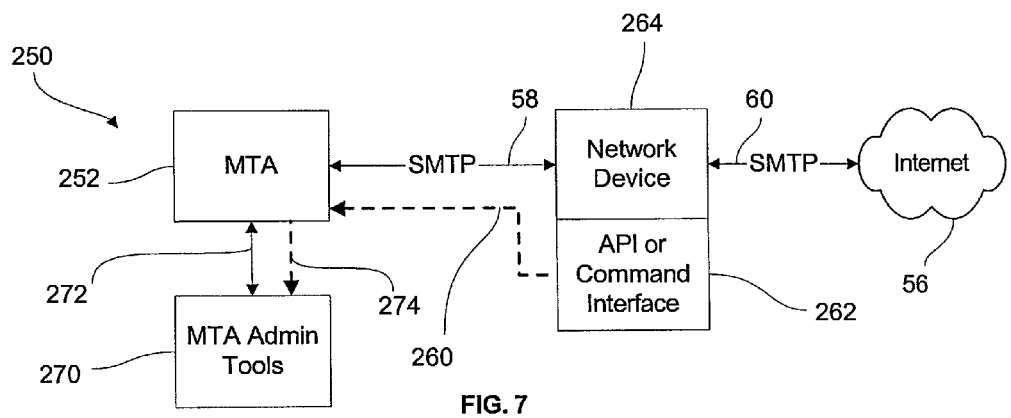
FIG. 7 is a flow chart illustrating a static configuration of capturing data from the network device at the MTA.
Figure 8:
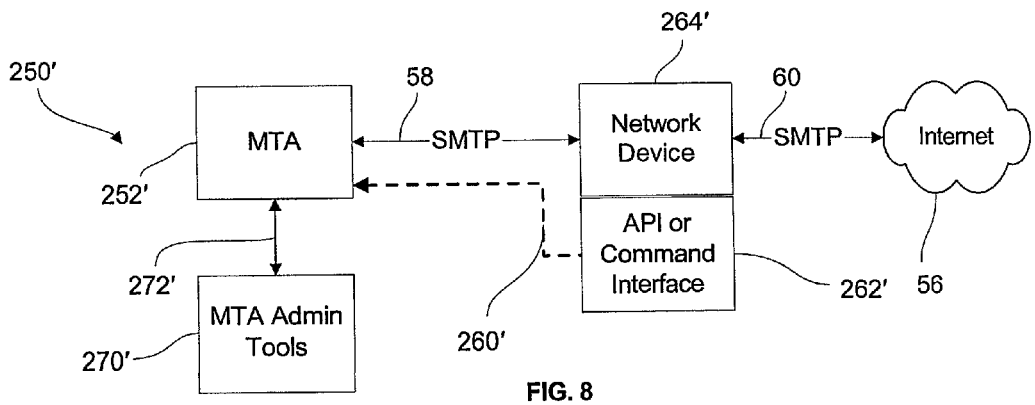
FIG. 8 is a flow chart illustrating a dynamic configuration of capturing data from the network device at the MTA.

In addition to publishing to the network device, the MTA (or MTA administrative console) may also capture data from the network device. That is, the information transfer may be initiated at Level 3 and transmitted to Level 7. Again, this can be accomplished as a static action, when the MTA and the network device are static until receiving a user input, or dynamically without user interaction. Both of these examples are illustrated in FIGS. 7 and 8, respectively. FIG. 7 shows a computer network system 250 including the same basic components as computer network system 150 of FIG. 4B, but an MTA 250 remains static until receiving through a communication channel 260 information regarding an active user input (not shown) at an interface 262 at a network device 264. A record of such information received may be kept, for example, at control interface 270 as received through an HTTP connection 272 or another interactive connection 274. Alternatively, information from the dynamic, network device 264 may be taken into consideration by a user monitoring control interface 270 in changing some other configuration in computer network system 250. In contrast, in a computer network system 250' shown in FIG. 8, network device 264' initiates the transfer of information to MTA 252' via communication channel 260' from interface 262' without user interaction. Since user interaction is not required in this case, control interface 270' may not even receive notice of such an action through an interactive connection, although an external user may still monitor such dynamic actions of the network device via HTTP connection 272'. These examples shown in FIGS. 7 and 8 are instances where the MTA, in Layer 7, may collect information regarding the network device, in Layer 3, statically or dynamically. Data that is acquired from the network device can be used to create an integrated management console for control of both the MTA and the network device.

Applications

The ability to transmit commands and share data between Layer 3 and Layer 7 creates an opportunity to more expeditiously execute specific routing and security functions for electronic message traffic on a mail network, thereby enhancing the input and/or output flow of electronic message traffic into and out of the computer network system. Certain examples taking advantage of this information exchange between Layer 3 and Layer 7 are discussed in detail immediately hereinafter.

Priority

An important problem in the current state of the art in electronic message transport is the ability to prioritize email traffic coming into, or out of, an email system, and, therefore, to prioritize messages and message traffic across servers and network devices. The configuration of the present disclosure employs a unique approach to true priority queue handing that allows email traffic to be prioritized for delivery, with the highest priority mail leaving the queue before the lower priority mail. This potent feature becomes more powerful when SMTP mail priority assignments can be transmitted to a network device for true IP precedence at the data packet level. When the priority routing though the MTA is combined with the packet priority, then true email priority is established throughout the network path, ensuring packet traffic is prioritized across network devices according to the same assignment as message traffic is prioritized in the MTA.

Such email traffic prioritization may be established, for example, by the following procedure:
1. Set a Priority configuration in the MTA to prioritize email traffic.
2. Publish settings from the MTA to the network device.
3. Mail traffic flows from the MTA through the network device with priority applied both at Layer 7 and Layer 3 (known as IP precedence)

Figure 9:
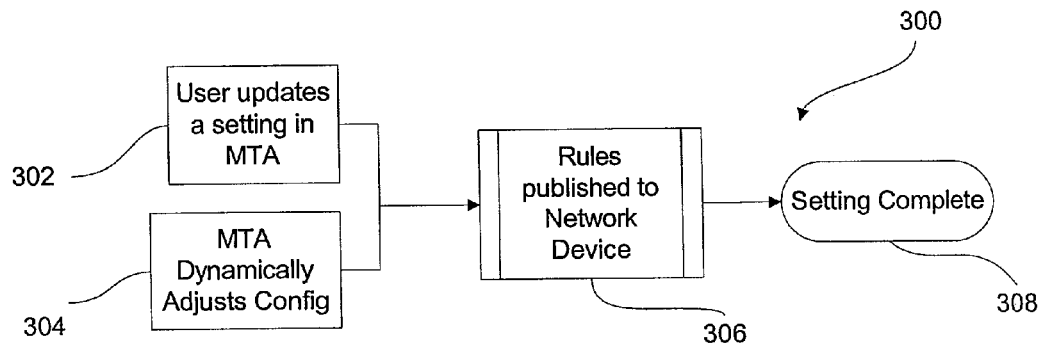
FIG. 9 is a flow chart illustrating a process of publishing settings from the MTA to the network device.

The details of the second step in email traffic prioritization are illustrated in FIG. 9. FIG. 9 shows an example of a flow 300 of information from the MTA (Layer 7) to the network device (Layer 3). At the MTA in the computer network, a user may update a setting in the MTA through a control interface (such as in MTA 152' of FIG. 5) in a step 302 or, alternatively, the MTA may dynamically adjust its configuration (such as in MTA 152" of FIG. 6). In either case, the updated MTA configuration (or "Rules") is published through a direct communication channel to the network device in a step 306. An updated setting of the computer network is then completed in a step 308.

Figure 10:
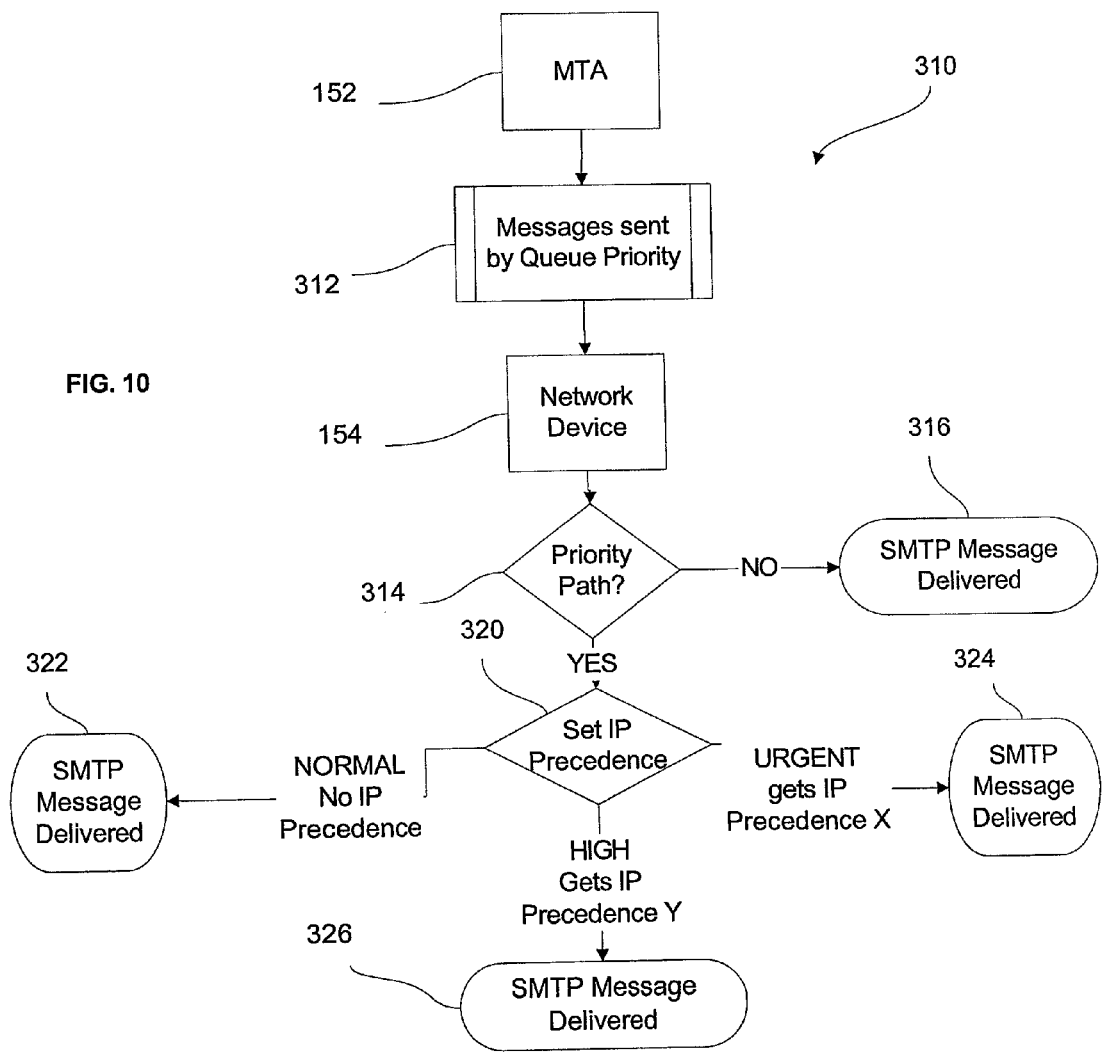
FIG. 10 is a hybrid flow chart illustrating a process of priority setting of mail flow in accordance with the present disclosure.

The overall message traffic prioritization process is illustrated in FIG. 10. A process 310 is initiated at MTA 152, which sends messages to network device 154 specifying email traffic prioritization (i.e., "Queue Priority") in a step 312. At network device 154, a decision 314 queries whether or not a priority path is required for a given message. If the answer to decision 314 is "NO", then that message is sent by normal SMTP communication in a step 316. If the answer to decision 314 is "YES", then the message is passed on to a next decision 320 to specify the level of priority required (i.e., "Set IP Precedence"). If the answer to decision 320 is "NORMAL", then no IP precedence is set and the message is delivered by normal SMTP, although ahead of messages that were not given a priority path in decision 314. If the answer to decision 320 is "URGENT", then the message receives a high level of IP precedence (e.g., "IP Precedence X") and is delivered with very high priority. If the answer to decision 320 is "HIGH", or some level between "NORMAL" and "URGENT", the message then receives a level of IP precedence between normal and high (e.g., "IP Precedence Y") and is delivered with medium priority. Such prioritization of email traffic at the network device (Layer 3) according to information received from the MTA (Layer 7) is considered advantageous over the prior art.

Quality of Service

Quality of service (QoS) is the ability to limit or guarantee network bandwidth for certain applications or network paths, a common function for network devices. In the present context, a network path is understood as a network traffic route from a single computer or system to another distinct computer or system.

In a mail network or system, there are advantages to functions that can limit electronic message traffic traveling across, or from, a server or network (i.e., impose bandwidth limitations). To this end; in the current art, some MTAs provide a method for limiting the number of simultaneous connections or messages sent per time interval. While this type of limitation is helpful, it is an imperfect means of controlling network traffic quantities and ensuring predictable traffic flows through network access points.

An advance over the existing art, as taught herein, is the ability to set true bandwidth limitations, from within the MTA, that will act directly on a relevant network device to control bandwidth available to the MTA for message traffic. This bandwidth control can be applied to inbound message traffic or outbound message traffic according to the demands and requirements of the network to ensure sustained flows and optimized throughput.

For example, such a bandwidth limitation process may work in the following manner:
1. Set a maximum bandwidth usage configuration in the MTA for message traffic (or a subset of message traffic).
2. Publish settings from the MTA to the network device (e.g., as illustrated in FIG. 9).
3. Mail traffic flows from the network device into the MTA with the applied limit on bandwidth utilization.
4. Mail traffic flows from the MTA to the network device where the limit on bandwidth utilization is applied to message traffic out of the device and out of the network.

Figure 11:
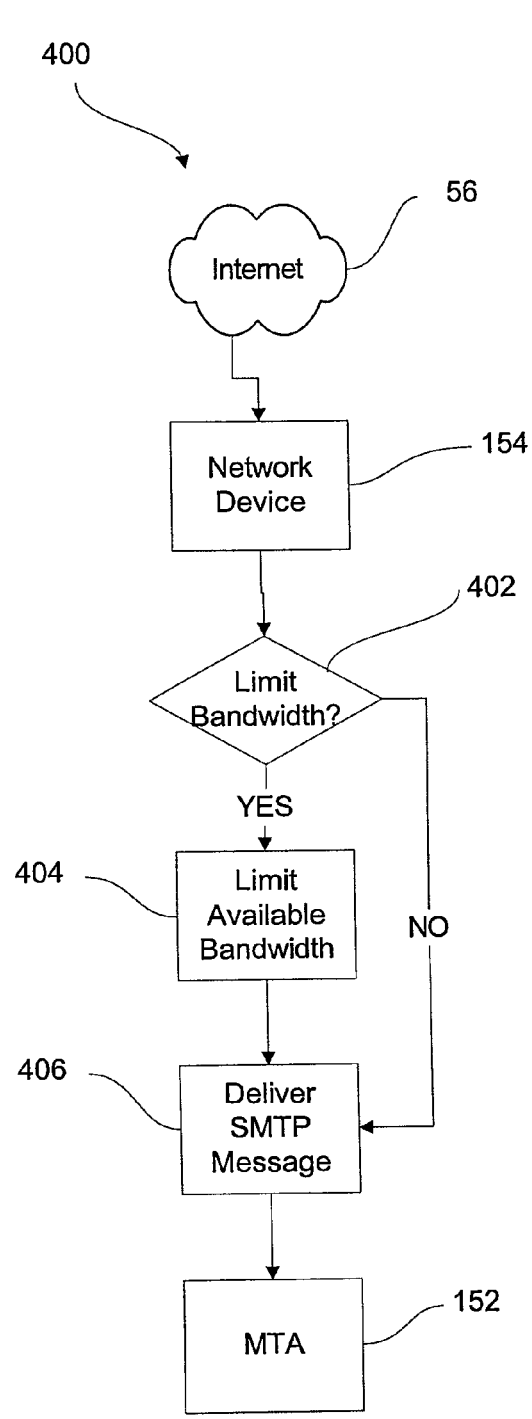
FIG. 11 is a flow chart illustrating a process of limiting bandwidth utilization for inbound electronic message traffic in accordance with the present disclosure.

In the process flow outlined above, step 3 concerns inbound bandwidth limitation and step 4 concerns outbound bandwidth limitation. An inbound bandwidth limitation process 400 for limiting bandwidth for messages received from Internet 56 through network device 154 and to MTA 152 is shown in FIG. 11. In accordance with the published settings received from the MTA in step 2 outlined above, network device 154 makes a decision 402 whether or not to limit the bandwidth usage. If the answer to decision 402 is "NO" (e.g., MTA 152 is ready to receive inbound messages), then the message received from Internet 56 is directed to MTA 152 by normal SMTP delivery. If the answer to decision 402 is "YES" (e.g., MTA 152 is unavailable or has some sort of error, or MTA 152 has been set to reject messages from a particular origination), then the available bandwidth for inbound delivery to MTA 152 is limited at network device 154 such that only some or none of the inbound messages are delivered to MTA 152 at this time.

Figure 12:
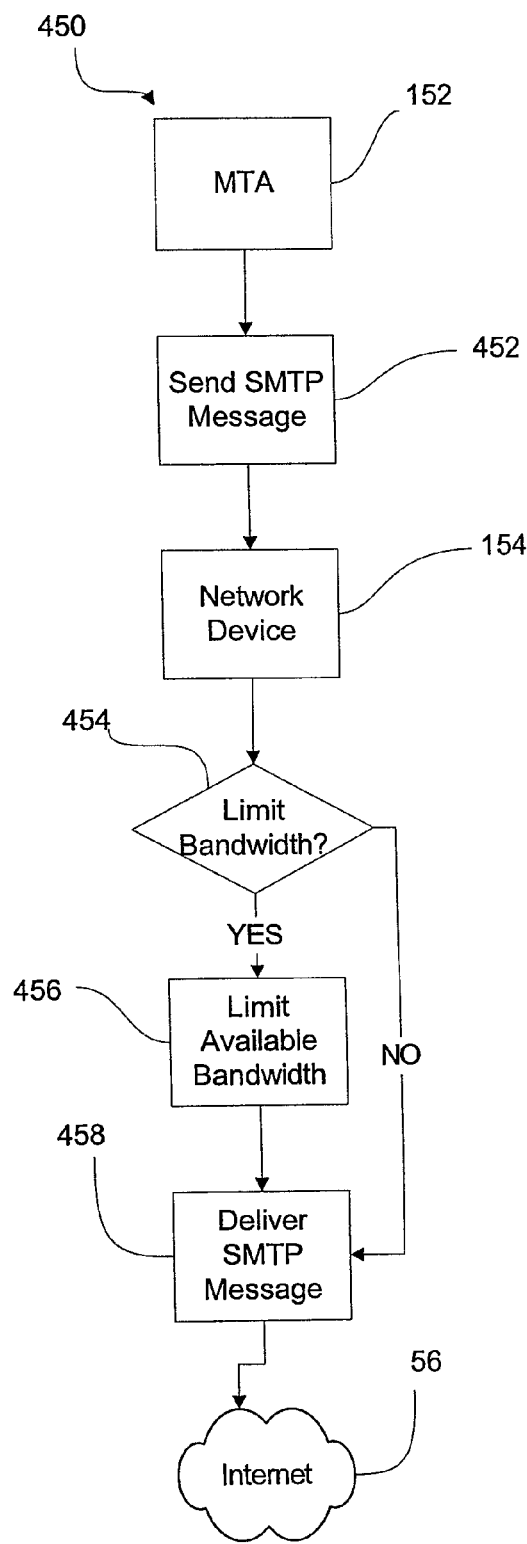
FIG. 12 is a flow chart illustrating a process of bandwidth guarantee for inbound electronic message traffic in accordance with the present disclosure.

A similar process for outbound bandwidth limitation is shown in FIG. 12. In an outbound bandwidth limitation process 450 begins with MTA 152 sending an SMTP message in a step 452 to network device 154. In accordance with the published settings received from MTA 152 in step 2 outlined above, network device 154 makes a decision 454 whether or not to limit the bandwidth usage for outbound messages. If the answer to decision 454 is "YES", then network device 154 limits the available bandwidth for outbound messages in a step 456 before proceeding to direct the outbound messages to Internet 56 in a SMTP message delivery step 458. Alternatively, if the answer to decision 454 is "NO", then the network device directs the outbound message to the delivery step without bandwidth limitation. Bandwidth limitation serves to prevent message delivery traffic from impairing other traffic on the same Internet connection when traffic volumes are high. For example, in a time period when SMTP traffic is high, message traffic may occupy bandwidth that is also used for a website, thereby impairing or inhibiting external access to that website. Outbound bandwidth limitation, such as that illustrated in FIG. 12, ensures that message traffic may only occupy a fixed amount of available bandwidth, thus allowing allocation of remaining bandwidth to other Internet programs such as websites, IP phones or data transfers. Similarly, inbound bandwidth limitation serves to preserve bandwidth for other programs, and is particularly useful as a preventative measure against inbound SMTP-based volume network attacks, such as an SMTP denial of service (DOS) attack designed to impair networks by consuming their inbound bandwidth and other resources.

The direct opposite of bandwidth limitation is to provide a guaranteed bandwidth allocation for a particular network path. This guaranteed bandwidth allocation can be assigned from a single computer or system to a distinct second computer or system. This provision allows a trusted, or known, route to always receive the bandwidth required to deliver messages. The origination of this guarantee may be from a system IP address, or even the originating email address. Thus, messages arriving from the Internet can be guaranteed a portion of bandwidth for all incoming connections and/or a specific amount of bandwidth can be guaranteed for outbound messages.

Such a bandwidth guarantee process may, for example, include the following steps:
1. Set a minimum bandwidth usage configuration in the MTA for message traffic (or a subset of message traffic).
2. Publish settings from the MTA to the network device (e.g., as shown in FIG. 9).
3. Mail traffic flows from the network device into the MTA with the applied minimum bandwidth allocation.

4. Mail traffic flows from the MTA to the network device where the minimum bandwidth allocation is applied to message traffic out of the device and out of the network.

Figure 13:
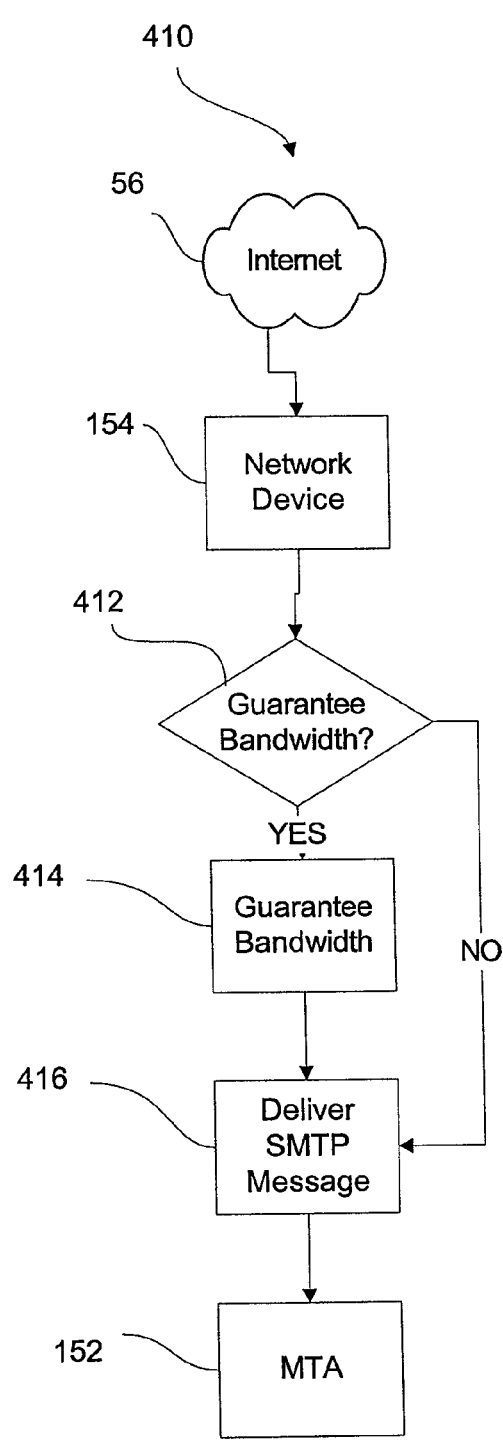
FIG. 13 is a flow chart illustrating a process of limiting bandwidth utilization for outbound electronic message traffic in accordance with the present disclosure.
Figure 14:
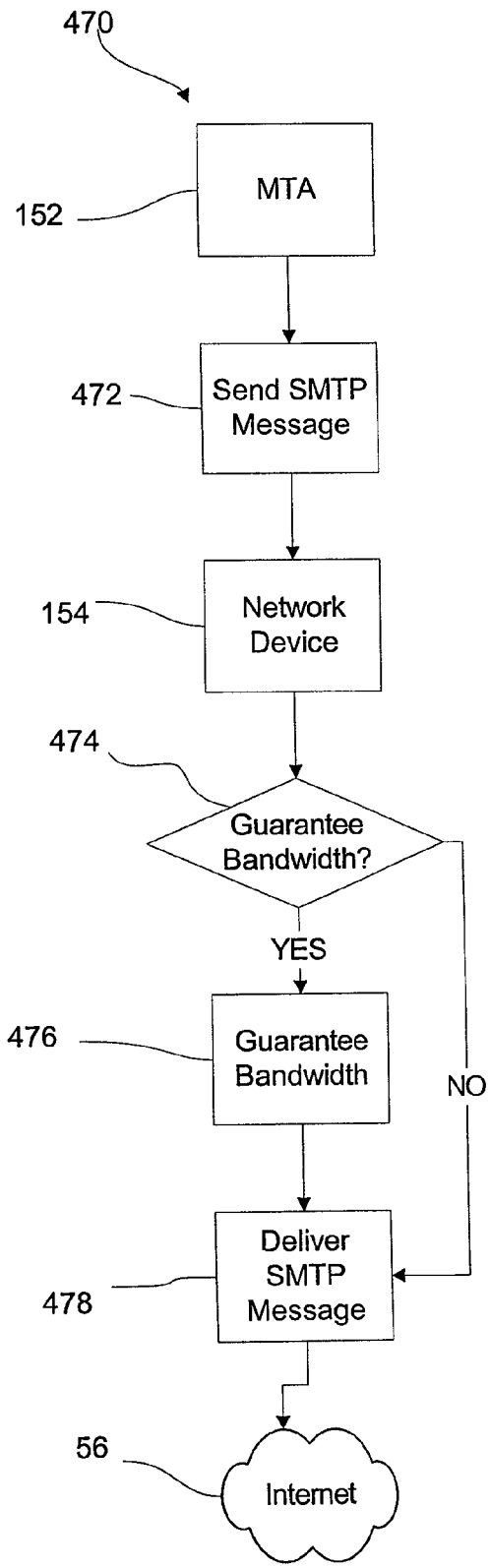
FIG. 14 is a flow chart illustrating a process of bandwidth guarantee for outbound electronic message traffic in accordance with the present disclosure.

The processes for bandwidth guarantee for inbound and outbound messages are illustrated in FIGS. 12 and 14, respectively. An inbound bandwidth guarantee process 410 for limiting bandwidth for messages received from Internet 56 through network device 154 and to MTA 152 is shown in FIG. 13. In accordance with the published settings received from the MTA in step 2 outlined above, network device 154 makes a decision 412 whether or not to guarantee the bandwidth usage for the delivery of the received message. If the answer to decision 412 is "NO" (e.g., MTA 152 has not specified bandwidth guarantee for the origination of a given inbound message), then messages received from Internet 56 is directed to MTA 152 under normal bandwidth constraints. If the answer to decision 412 is "YES" (e.g., MTA 152 has requested bandwidth guarantee for messages from the particular origination), then the available bandwidth for inbound delivery to MTA 152 is guaranteed at network device 154 for inbound messages to MTA 152.

Similarly, an outbound bandwidth guarantee process 470 begins with MTA 152 sending an SMTP message in a step 472 to network device 154. In accordance with the published settings received from MTA 152 in step 2 outlined above, network device 154 makes a decision 474 whether or not to guarantee the bandwidth usage for outbound messages. If the answer to decision 474 is "YES", then network device 154 guarantees the available bandwidth for outbound messages in a step 476 before proceeding to direct all of the outbound messages to Internet 56 in a SMTP message delivery step 478. Alternatively, if the answer to decision 474 is "NO", then the network device directs outbound messages to the delivery step without bandwidth guarantee.

Load Balancing/Fail-Over

In a typical large network, there are multiple electronic message servers for handling traffic and ensuring continuous flow of traffic in the event of temporary spikes in traffic or the failure of any one server or connection.

In the current state of the art, traffic flows to and from these servers are managed using network devices operating on Layer 3 packet data. These network devices distribute traffic across servers, "load balancing" and, in the event of a failure, discontinue traffic to the failed server or route and direct traffic to functioning routes, "fail-over". Configuration of the commands applied to these traffic flows is done using the administrative console (usually command line) provided by the network device and unrelated to any direct information on electronic message traffic per se.

An advancement over the art is achieved by integrating the selection and application of load balancing and fail-over settings within the administrative console of a cluster of MTAs. In this system, the administrators responsible for the system can easily configure a robust, scalable email network while working within the MTA's administrative environment. It also provides the ability to relate load balancing and fail-over instructions to both message traffic flows and system usage settings for the MTA. This is particularly important because it means that traffic flows can be altered by the network device as system usage thresholds are reached in the MTA prior to, and as prevention against, any actual failures.

Such a load balancing/fail-over process may work as follows:

1. Install/set-up multiple MTA servers within a cluster management interface for the MTAs.
2. Configure load balancing and fail-over settings within the MTA preferences for the cluster
3. Publish this configuration to all MTA servers and the network devices [FIG. 16]
4. Load balancing is performed across mail servers. Mail traffic is accepted from the Internet, and the network device sends each message, or session, to the next MTA that is connected to the network device. This happens in an endless loop, starting over at the beginning, when it reaches the end of the list.

This process could also be accomplished by using a "least used" algorithm that determines which MTA is available for a new SMTP session. These are representative samples of algorithms, which may be used for message distribution and flow from the network device to a series of MTAs.
5. Fail-over is performed across mail servers. In the scenario shown in FIG. 17, an MTA has lost its connection to the network device. The network device determines that it can no longer send SMTP sessions to this MTA, and so it only delivers sessions to the first MTA.

Figure 15:
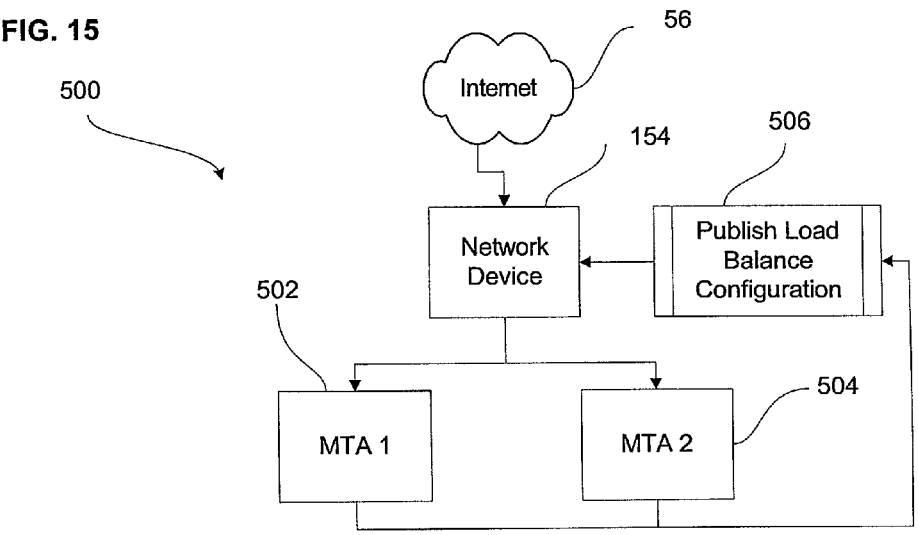
FIG. 15 is a flow chart illustrating a communication loop by round robin load distribution in accordance with the present disclosure.

An example of a round robin load distribution process is shown in FIG. 15. In a process 500 of FIG. 15, Layer 7 includes two MTAs (MTA 1 and MTA 2, indicated by reference numerals 502 and 504, respectively) connected with network device 154. Each of MTA 1 and MTA 2 publish their load balance configuration to network device 154 in a step 506. According to the published load balance configuration received from MTAs 1 and 2, the network device distributes the inbound messages received from Internet 56. The round robin load distribution process corresponds to step 4 in the load balancing/fail-over process outlined above.

Figure 16:
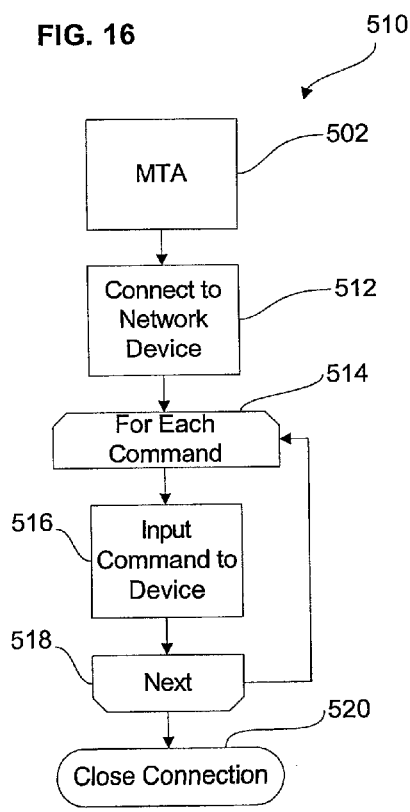
FIG. 16 is a flow chart illustrating a process of publishing the MTA configuration to network devices in accordance with the present disclosure.

The step of the publication of load balance configuration is illustrated in further detail in FIG. 16. A publication process 510 is initiated at, for example, MTA 502, which connects to the network device in a step 512. Given a series of commands, for each command a step 514 initiates a process 516 to input the command to the network device. At the completion of the command input, a step 518 checks for another command. If there are more commands, then the process returns to step 514. If all of the commands have been directed to the network device, then the connection from the MTA to the network device is closed in a step 520. In this way, the MTA in Layer 7 communicates information regarding its load status to the network device in Layer 3 by a direct communication.

Figure 17:
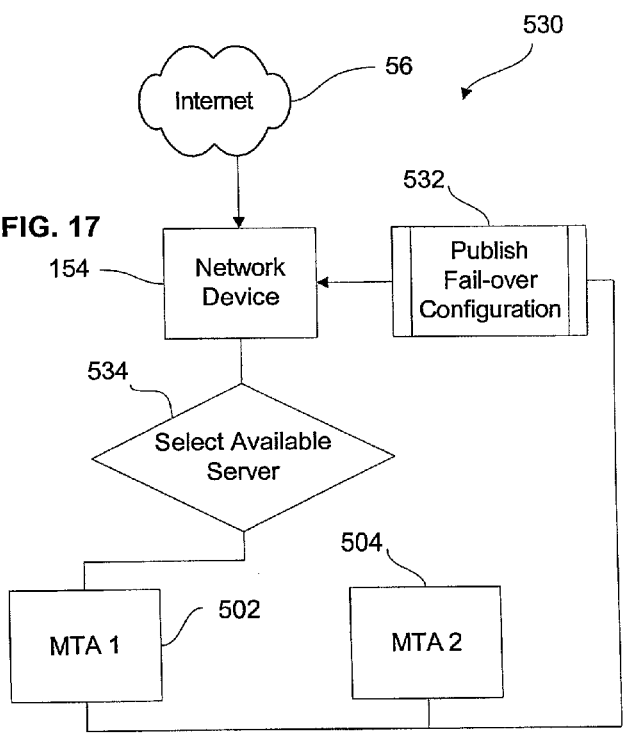
FIG. 17 is a flow chart illustrating a process of fail-over distribution in accordance with the present disclosure.

An example of a fail-over distribution process is shown in FIG. 17. In a process 530 of FIG. 17, Layer 7 again includes two MTAs connected with network device 154. Each of MTA 1 and MTA 2 publish their fail-over configuration to network device 154 in a step 532. This publication step 532 may follow, for example, publication process 510 as illustrated in FIG. 16. In this way, the network device is made aware of which, if any, of the MTAs may be unavailable (i.e., failed). Then, according to this information received from the MTAs, the network device selects an available server in a step 534 for delivery of incoming messages from Internet 56. This fail-over process corresponds to step 5 in the load balancing/fail-over process outlined above.

Vpn/Secure Delivery

In the current state of the art, if an MTA is required to make a secure delivery from one server to another, they must both be configured to use an established secure SMTP transport protocol such as transport layer security (TLS). While this may be appropriate for general delivery to unknown domains, it is cumbersome in terms of processing and lacks the efficiency of secure data transport performed at Layer 3.

An advancement over the prior art is the ability to leverage a network Virtual Private Network (VPN) service to form a true IP delivery tunnel from point A to point B. This improvement would prove particularly advantageous for electronic messaging between network sites for the same operator (i.e. company) where a VPN already exists to handle other types of network traffic. Such a solution requires the MTA to recognize a network path as being VPN enabled. Once that discovery is made, the MTA would initiate the VPN connection, execute the SMTP delivery of email messages and disconnect. Alternatively, the MTA may pre-connect to VPN enabled routes and only deliver via those routes for mail traffic that is being sent to that particular end point. The receiving MTA may also be configured to accept incoming VPN connections to receive secure email.

Such a secure delivery process may take place as one of the following:
 1. A dynamic VPN connection is established when the MTA qualifies the receiver as being VPN enabled.
 2. Alternatively, a mail traffic route can be verified against a static VPN route. The MTA can then choose to use this static VPN connection for message routing.

Figure 18:
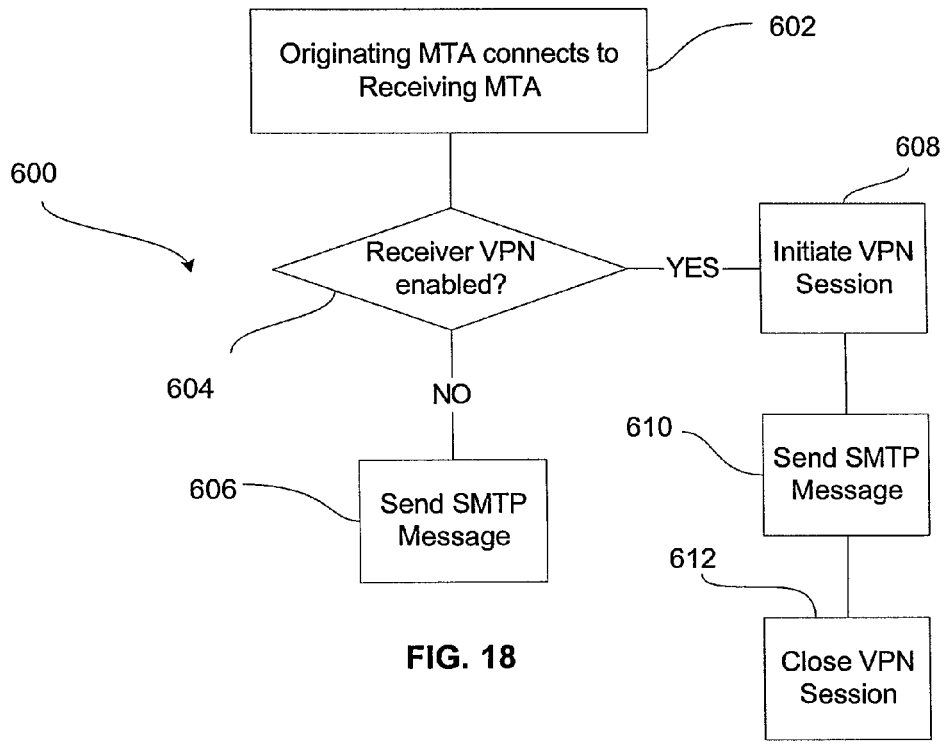
FIG. 18 is a flow chart illustrating a process of dynamic VPN connection in accordance with the present disclosure.
Figure 19:
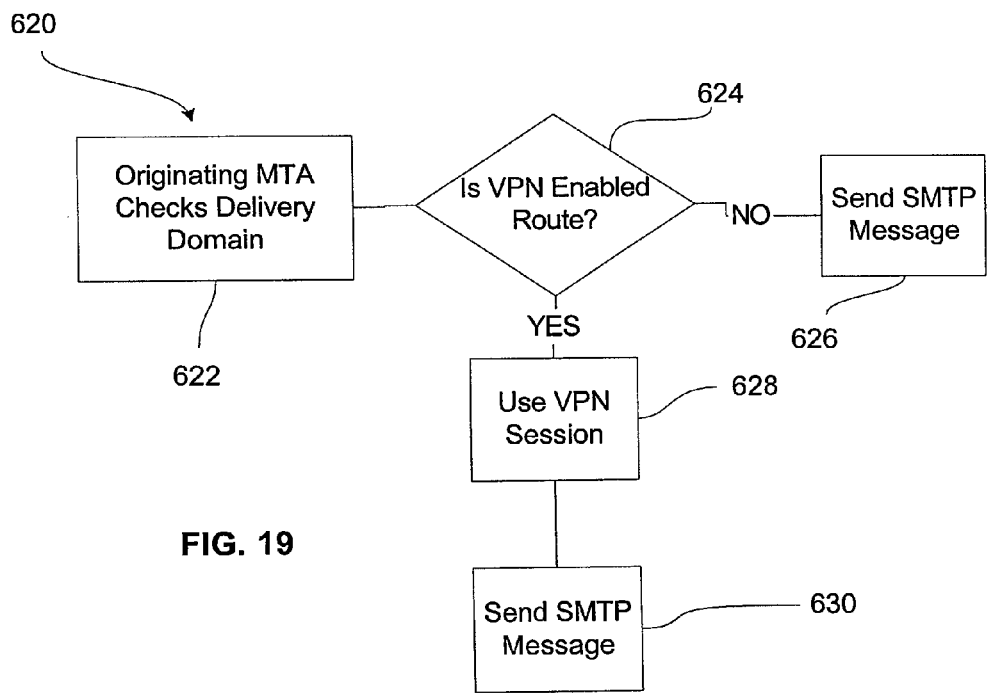
FIG. 19 is a flow chart illustrating a process of static VPN connection in accordance with the present disclosure.

Processes 1 and 2, set forth immediately above, are illustrated, respectively, in FIGS. 18 and 19. A dynamic, secure delivery process 600 in FIG. 18 begins in a step 602, in which an originating MTA connects to a receiving MTA. A decision 604 determines whether or not VPN is enabled at the receiving MTA. If the answer to decision 604 is "NO", then the message is sent in a step 606 using normal SMTP delivery. If the answer to decision 604 is "YES", then the originating MTA initiates a VPN session in a step 608. Once the message is sent securely over the VPN in a step 610, then the VPN session is closed in a step 612.

An alternative, static, secure delivery process 620 is shown in FIG. 19. In static, secure delivery process 620, the originating MTA checks the delivery domain in a step 622 and determines, in a decision 624, whether or not the given mail traffic route is a static VPN route. If the answer to decision 624 is "NO", then the message is sent in a step 626 by normal SMTP delivery. If the answer to decision 624 is "YES", then the originating MTA establishes a connection to the receiving MTA through the existing VPN session in a step 628 then sends the message therethrough in a step 630.

Network Anomaly Detection

There is a clear and significant advantage to linking an MTA to a network intrusion detection or anomaly detection system. With the emergence of technologies that enable unauthorized users to illicitly send email from remote PCs and servers ("Zombie hosts"), there are new requirements for routing outbound port 25 (SMTP) traffic to an MTA for re-broadcast, enabling a network operator to enforce defined email traffic policies and identify anomalies, thus minimizing or eliminating Zombie traffic.

Likewise, an MTA can monitor inbound email traffic for unusual activity, such as a single local computer sending an abnormally large amount of email, in order to inhibit or block this traffic by passing this information to an intrusion detection system (IDS) that can throttle or stop traffic at the network device.

The process of determining an outbound message traffic anomaly from a zombie mail host is set forth below. A zombie mail host is understood to be a server inside the local network that may have been compromised, or otherwise is not allowed to send SMTP traffic.

Such message traffic anomaly detection may be performed as follows:
 1. The zombie host sends network traffic on port 25 to the network device.
 2. This traffic is re-routed to the MTA for delivery and verification of validity.
 3. If it is not valid or acceptable traffic, the message is discarded.

Figure 20:
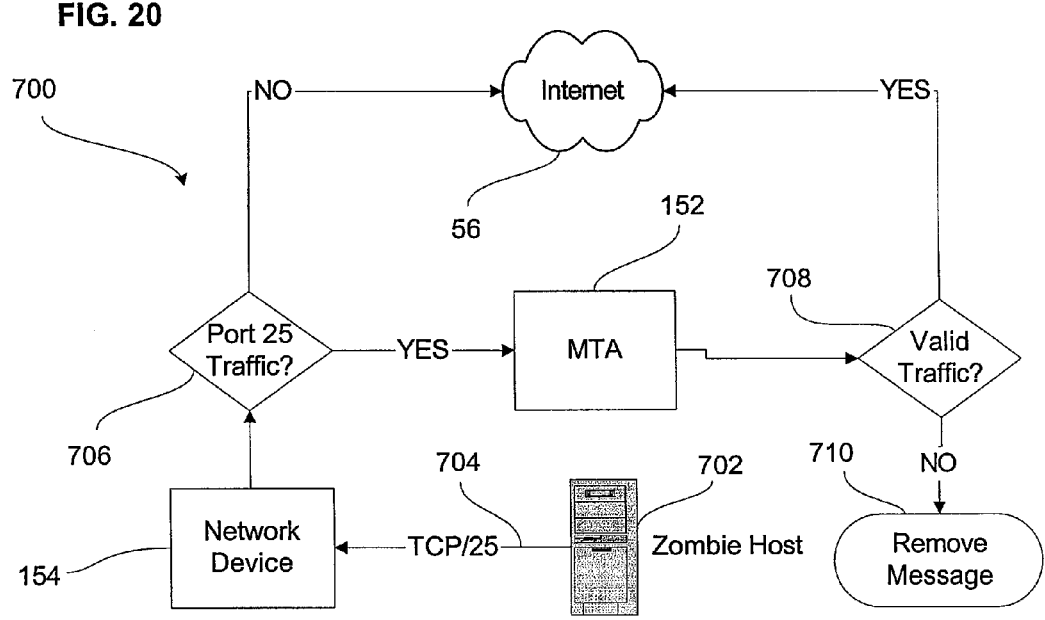
FIG. 20 is a flow chart illustrating a process of determining an outbound message traffic anomaly in accordance with the present disclosure.

This zombie mail host detection process for outbound messages is also illustrated in FIG. 20. A process 700 begins when a zombie host 702 directs network traffic (i.e., sends email messages) via port 25 connection (as indicated by an arrow 704) to network device 154. Network device 154 then determines in a decision 706 whether or not the received network traffic has been received through port 25. If the answer to decision 706 is "NO", then the network traffic is allowed to pass to Internet 56. If the answer to decision 706 is "YES", then the network traffic is directed to MTA 152 for further verification of validity in a decision 708. If the answer to decision 708 is "YES", then the network traffic is allowed to pass to Internet 56. If the answer to decision 708 is "NO", then the received messages are removed from the network system in a step 710.

Similarly, the process of determining an inbound message traffic anomaly and transmitting that information to an intrusion detection device for action is set forth as follows:
 1. SMTP traffic arrives from the Internet at the MTA.
 2. If this traffic is considered valid, it is handled normally.
 3. If the traffic is irregular, or suspect, it is passed to the IDS system for further monitoring and/or action.

Figure 21:
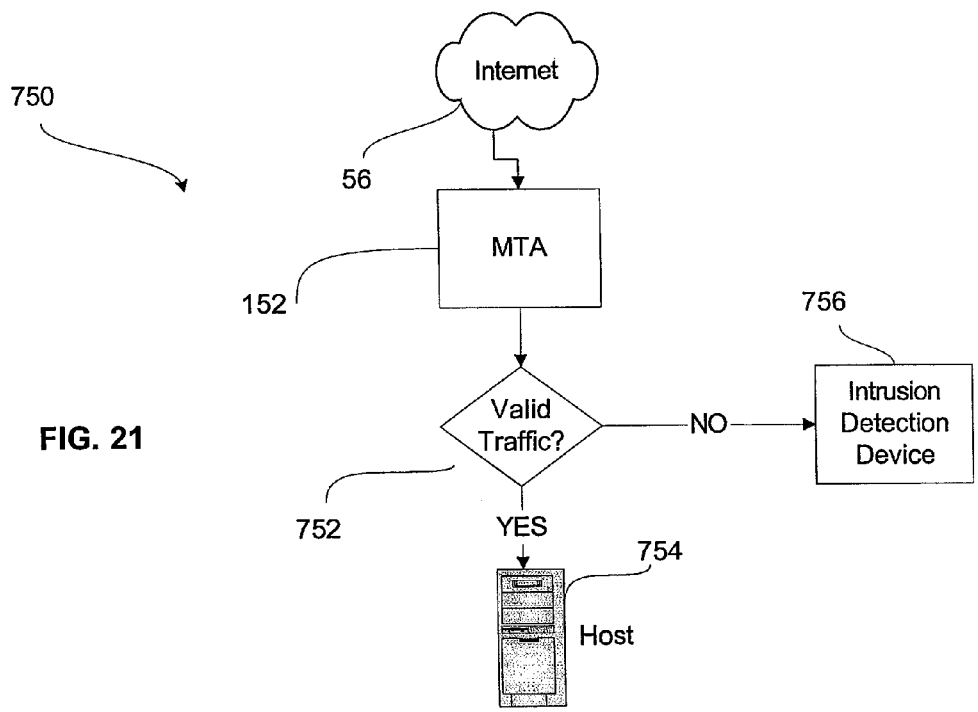
FIG. 21 is a flow chart illustrating a process of determining an inbound message traffic anomaly in accordance with the present disclosure.

Specifically referring to FIG. 21, a process 750 begins when MTA 152 receives inbound message traffic from Internet 56. MTA 152 makes a decision 752 whether or not the inbound message traffic is valid traffic. If the answer to decision 752 is "YES", then the inbound messages are delivered normally to the recipients specified in the messages. If the answer to decision 752 is "NO", then the inbound messages are directed to an intrusion detection device 756.

Real-Time IP Session Data Monitors

The network device may transmit commands and data to the MTA. A network device, such as a switch or router, can track the real-time flow of packets through its systems. This information can be used to dynamically, and without user interaction, change the throughput characteristics of a particular network path. For example, an IP address that is seen as a major inbound source can be checked against a published blacklist (RBL) or reverse domain name service (RDNS) lookup. If that IP is deemed suspect, it can automatically be limited to a smaller percentage of bandwidth utilization and thus, more limited access to messages from that origin into the local network is realized.

Such a monitoring process may work as follows:
 1. The MTA's monitoring console collects IP session data.
 2. This application accepts the session data and then runs it thru a processing chain.
 3. Results of the processing are reported back to the MTA and the network device to create dynamic mail flow rules.

Figure 22:
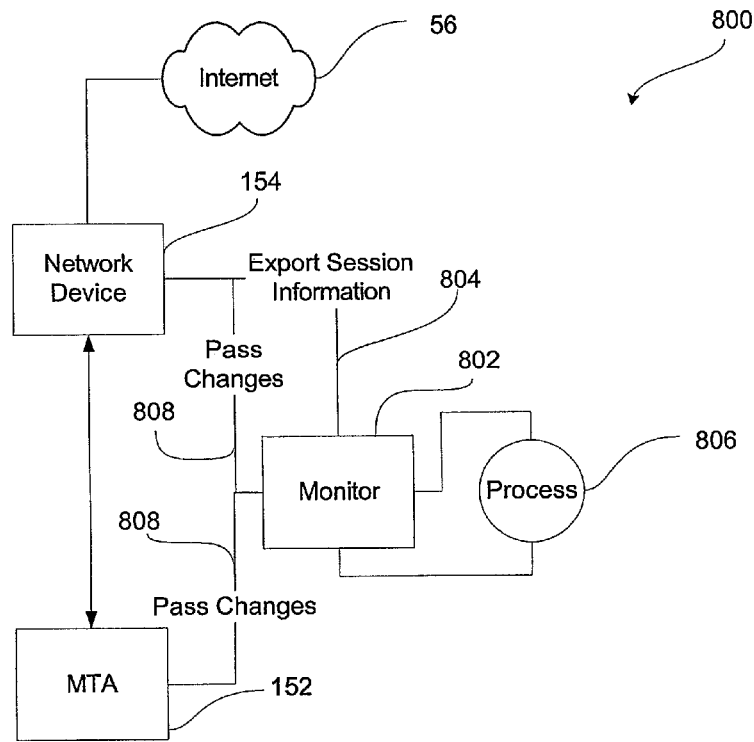
FIG. 22 is a flow chart illustrating a process of the collection of IP session data by the MTA in accordance with the present disclosure.

Step 1 of the above monitoring process is illustrated in FIG. 22. A monitoring process 800 involves an interconnection of MTA 152 and network device 154, which in turn is connected to Internet 56. MTA 152 includes an additional monitoring console 802. Monitoring console 802 receives export session information (i.e., IP session data) from network device 154 (as indicated by an arrow 804) and processes the information through a processing chain 806. If there are changes in the IP session data received from the network device, monitoring console 802 then passes the changes to one or both of network device 154 and MTA 152.

Figure 23:
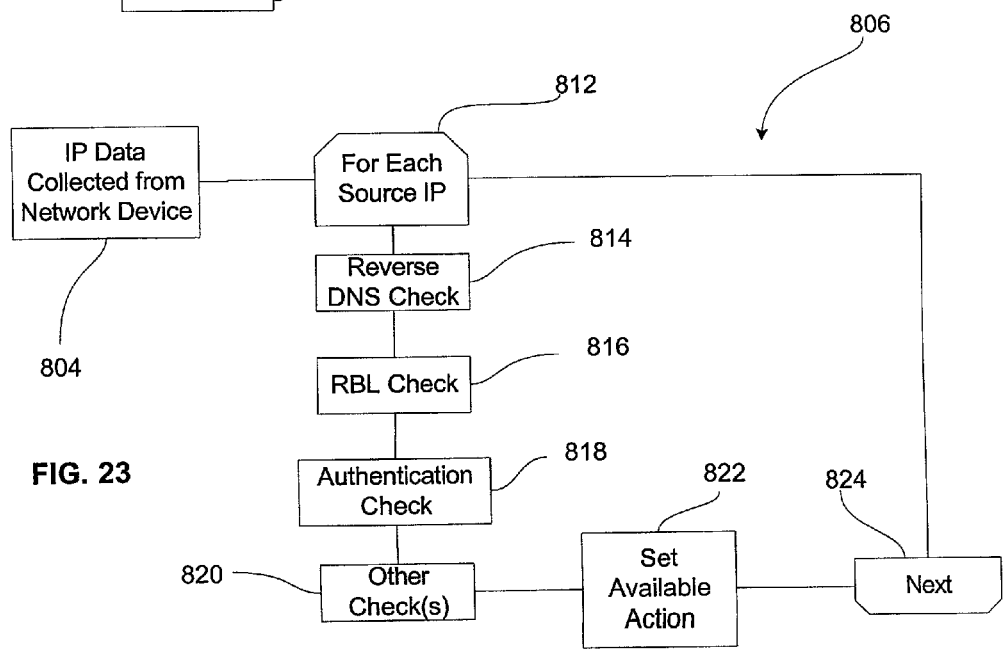
FIG. 23 is a flow chart illustrating a processing chain in the collection of IP data by the MTA in accordance with the present disclosure.

Details of an exemplary, processing chain 806 are illustrated in FIG. 23. Processing chain 806 takes IP session data 804 from network device 154 and initiates a step 812 for each source IP. For each source IP, step 812 is followed by a step 814 for a reverse domain name server (DNS) check, a step 816 for a realtime block list (RBL) check, a step 818 for an authentication check and a step 820 for additional checks if desired. Following the checking steps, a step 822 sets the available action to be taken then advances to a next step 824 for the next source IP. This processing allows the network device to inform the MTA which traffic is flowing over the network and therefore allows the MTA to make processing judgments on the traffic flow. Additional actions which may be taken include bandwidth limitations or guarantees, up to and including the complete revocation of bandwidth, setting priority of messages or changing the mail flow so that additional scanning may take place.

Conclusion

Although each of the aforedescribed embodiments have been illustrated with various components having particular respective orientations, it should be understood that another embodiment may be configured with a variety of specific configurations with the various components being located in a wide variety of positions and mutual orientations and still remain within the spirit and scope of the present disclosure. Furthermore, suitable equivalents may be used in place of or in addition to the various components, the function and use of such substitute or additional components being held to be familiar to those skilled in the art and are therefore regarded as falling within the scope of the present disclosure. For example, although each of the aforedescribed embodiments have been discussed mainly using the case of e-mail messaging, the electronic message delivery system of the present disclosure may be readily configured to accommodate other types of electronic messages such as, for instance, messages to and from cellular phones and other handheld devices, Internet protocol-based voice traffic (i.e., voice over IP, or VOIP) or session initiation protocol (SIP) messages.

Therefore, the present examples are to be considered as illustrative and not restrictive, and the disclosure is not to be limited to the details given herein but may be modified within the scope of the appended claims.

What is claimed is:

1. A method for managing an input flow and an output flow of electronic message traffic into and out of a computer network system based on an open system interconnection model and including at least a network layer (Layer 3) and an application layer (Layer 7), the method comprising:
   exchanging information directly between Layer 3 and Layer 7, wherein Layer 7 is configured for handling software applications for producing electronic message traffic which includes a plurality of data packets, and wherein Layer 3 is configured for processing the plurality of data packets;
   at Layer 3, receiving from Layer 7 information regarding the software applications being handled at Layer 7;
   based on the information, enhancing at least one of the input flow and the output flow of the electronic message traffic; and
   at Layer 3, enhancing by modifying the processing of the plurality of data packets, in accordance with the information received from Layer 7.

2. The method of claim 1, wherein said modifying at Layer 3 includes identifying a selected group of data packets from said plurality of data packets, and allocating a guaranteed bandwidth for said selected group of data packets, in accordance with the information received from Layer 7.

3. The method of claim 1, wherein said modifying at Layer 3 includes prioritizing said plurality of data packets, in accordance with the information received from Layer 7.

4. The method of claim 1, wherein said modifying at Layer 3 includes setting a limit on bandwidth available for said processing of the plurality of data packets, in accordance with the information received from Layer 7.

5. The method of claim 1, wherein Layer 7 is configured for handling software applications for producing said input flow and said output flow of electronic message traffic, which electronic message traffic includes a plurality of data packets, and wherein Layer 3 is configured for monitoring a set of network conditions, and said method further comprising:
   at Layer 7, receiving from Layer 3 information regarding the set of network conditions; and
   at Layer 7, enhancing by modifying said handling of software applications in accordance with the information received from Layer 3.

6. The method of claim 5, wherein said modifying at Layer 7 includes prioritizing said plurality of data packets in said at least one of said input flow and said output flow of the electronic message traffic, in accordance with the information received from Layer 3.

7. The method of claim 5, wherein said modifying at Layer 7 includes setting a limit on bandwidth
   available to the software applications at Layer 7, in accordance with the information received from Layer 3.

8. The method of claim 7, wherein said setting the limit on bandwidth includes reducing the bandwidth of at least a selected one of the input flow and the output flow to zero in accordance with the information received from Layer 3.

9. The method of claim 5, wherein Layer 3 includes at least first and second network devices, and wherein said modifying at Layer 7 includes directing said plurality of data packets to a selected one of said first and second network devices, in accordance with the information received from Layer 3.

10. The method of claim 1, wherein Layer 7 is configured for handling software applications for producing said electronic message traffic, which electronic message traffic includes a plurality of data packets, and wherein Layer 3 is configured for processing the plurality of data packets while monitoring a set of network conditions, and the method further comprising:
   at Layer 3, receiving from Layer 7, first information regarding the software applications being handled at Layer 7;
   at Layer 3, modifying said processing of the plurality of data packets in accordance with the first information received from Layer 7;
   at Layer 7, receiving from Layer 3 second information regarding the set of network conditions; and
   at Layer 7, modifying said handling of software applications in accordance with the second information received from Layer 3 so as to enhance said at least one of said input flow and said output flow of the electronic message traffic.

11. A computer network system based on an open system interconnection model, the computer network system being configured to support an input flow and an output flow of electronic message traffic into and out of the computer network system, respectively, the computer network system comprising:
   a network layer (Layer 3), comprising a network device;
   an application layer (Layer 7); and
   a communication channel between Layer 3 and Layer 7 for exchanging information directly therebetween for use in enhancing at least a selected one of the input flow and the output flow of the electronic message traffic;

wherein Layer 7 includes software applications for producing the electronic message traffic which includes a plurality of data packets; and wherein Layer 3 includes a receiving arrangement for receiving, from Layer 7 and through the communication channel, information regarding the software applications at Layer 7, and a processing arrangement for processing, in accordance with the information received from Layer 7, the plurality of data packets so as to enhance the selected one of the flows.

12. The computer network system of claim 11, wherein the processing arrangement is further configured for:

identifying a selected group of data packets from said plurality of data packets, and allocating a guaranteed bandwidth for said selected group of data packets, in accordance with the information received from Layer 7.

13. The computer network system of claim 11, wherein Layer 3 includes a monitoring arrangement for monitoring a set of network conditions, and wherein Layer 7 includes a receiving arrangement for receiving, from Layer 3 and through the communication channel, information regarding the set of network conditions, and at least one software application for producing the input flow and the output flow of electronic message traffic, in accordance with the information received from Layer 3, so as to enhance the selected one of said flows.

14. The computer network system of claim 13, wherein said software application is configured for prioritizing at least one of said input flow and said output flow of the electronic message traffic, in accordance with the information received from Layer 3.

15. The computer network system of claim 13, wherein Layer 7 further includes a limiting arrangement for setting a limit on bandwidth available to the software application, in accordance with the information received from Layer 3.

16. The computer network system of claim 13, wherein Layer 3 includes at least first and second network devices, and wherein the software application is configured for directing said output flow of the electronic message traffic to a selected one of said first and second network devices, in accordance with the information received from Layer 3.

17. The computer network system of claim 11, wherein Layer 7 includes software applications for producing said electronic message traffic, which electronic message traffic includes a plurality of data packets, and Layer 3 includes a receiving arrangement for receiving, from Layer 7 and through the communication channel, information regarding the software applications at Layer 7, a processing arrangement for processing, in accordance with the information received from Layer 7, the plurality of data packets, and a monitoring arrangement for monitoring a set of network conditions, and Layer 7 further includes an additional receiving arrangement for receiving, from Layer 3 and through the communication channel, information regarding the set of network conditions, and wherein the at least one software application is configured for modifying the producing of the input flow and the output flow of electronic message traffic, in accordance with the information received from Layer 3, so as to enhance said at least one of the input flow and the output flow of the electronic message traffic.

18. A configuration in a computer network system based on an open system interconnection model and including a network layer (Layer 3), comprising a network device and an application layer (Layer 7), the computer network system being configured to support an input flow and an output flow of electronic message traffic into and out of the computer network system, respectively, the configuration comprising:

a communication channel between Layer 3 and Layer 7 for exchanging information directly therebetween for use in enhancing at least one of said input flow and said output flow of said electronic message traffic;

wherein Layer 7 includes software applications for producing the electronic message traffic which includes a plurality of data packets; and wherein Layer 3 includes a receiving arrangement for receiving, from Layer 7 and through the communication channel, information regarding the software applications at Layer 7, and a processing arrangement for processing, in accordance with the information received from Layer 7, the plurality of data packets so as to enhance the selected one of the flows.

* * * * *